(12) United States Patent
Lin et al.

(10) Patent No.: US 8,513,519 B2
(45) Date of Patent: Aug. 20, 2013

(54) USE OF EXFOLIATED CLAY NANOPLATELETS AND METHOD FOR ENCAPSULATING CATIONS

(75) Inventors: King-Fu Lin, Taipei (TW); Chia-Hsin Lee, Taipei (TW); Keng-Jen Lin, Taipei (TW); Ken-Yen Liu, Taipei (TW)

(73) Assignee: National Taiwan University, Taipei (TW)

( * ) Notice: Subject to any disclaimer, the term of this patent is extended or adjusted under 35 U.S.C. 154(b) by 414 days.

(21) Appl. No.: 12/800,866

(22) Filed: May 24, 2010

(65) Prior Publication Data

US 2011/0031429 A1 Feb. 10, 2011

(30) Foreign Application Priority Data

Aug. 4, 2009 (TW) .............................. 98126146 A

(51) Int. Cl.
*H01L 31/04* (2006.01)
(52) U.S. Cl.
USPC ........................................................ 136/263
(58) Field of Classification Search
USPC ........................................ 252/62.2; 136/263
See application file for complete search history.

(56) References Cited

U.S. PATENT DOCUMENTS

| 5,998,528 A | 12/1999 | Tsipursky et al. |
| 8,299,270 B2 * | 10/2012 | Maruyama ................. 548/314.4 |
| 2010/0039690 A1 * | 2/2010 | Agrawal et al. ............... 359/265 |

FOREIGN PATENT DOCUMENTS

| TW | 1288648 | 7/1994 |
| TW | I284654 | 3/1995 |
| TW | 586248 B | 5/2004 |
| TW | 200844148 | 11/2008 |

* cited by examiner

*Primary Examiner* — Carol M Koslow
(74) *Attorney, Agent, or Firm* — Edwards Wildman Palmer LLP; Peter F. Corless, Esq.; Steven M. Jensen, Esq.

(57) ABSTRACT

This invention relates to a method for making an electrolyte composition of a dye-sensitized solar cell comprising utilizing exfoliated clay nanoplatelets and the method for rapidly encapsulating cations. The electrolyte composition mainly includes exfoliated clay nanoplatelets, an ionic liquid and iodine. The method for rapidly encapsulating cation comprises adding the exfoliated clay nanoplatelets into a cationic solution, wherein the exfoliated clay nanoplatelets encapsulates cations and recovers into a layered structure such that phase separation of the solution occurs; and filtrating the solution to separate the clay nanoplatelets encapsulating the cations. The exfoliated clay nanoplatelets have a unique property of encapsulation for the cations, is suitable for use in an electrolyte composition for dye-sensitized solar cells, cationic drug encapsulation and environmental protection.

14 Claims, 5 Drawing Sheets

US 8,513,519 B2

USE OF EXFOLIATED CLAY NANOPLATELETS AND METHOD FOR ENCAPSULATING CATIONS

This application claims under 35 U.S.C. §119(a) the benefit of Taiwanese Application Number 98126146 filed Aug. 4, 2009, the entire contents of which is incorporated herein by its reference.

BACKGROUND OF THE INVENTION

1. Field of the Invention

The present invention relates generally to the use of exfoliated clay nanoplatelets, and more particularly to a method for making an electrolyte composition of a dye-sensitized solar cell utilizing exfoliated clay nanoplatelets, and a method for instantly encapsulating cations.

2. Description of Related Art

Clay is a natural material with a layered structure, which is mainly composed of layered silicate and has excellent heat resistance, chemical corrosion resistance and low expansion coefficient. Cations entrapped between clay layers are such as $Li^+$, $Na^+$, $K^+$, $Ca^{2+}$, $Mg^{2+}$, $Ba^{2+}$, $La^{3+}$, $Ce^{2+}$. In the prior art, a cationic surfactant is usually used as an intercalation agent, which is mixed with a monomer and inserted between the clay layers for polymerization so as to disperse the clay layers, which, however, only increases the distance between the clay layers without achieving complete exfoliation of the clay layers.

Taiwan Patent No. I284654 discloses a fabrication method of clay nanoplatelets, wherein a water-soluble initial agent, a polar monomer and a layered clay material are used for emulsifier-free emulsion polymerization, and then a solvent is used to remove the polymer matrix so as to form clay nanoplatelets. However, the patent does not disclose the application of the clay nanoplatelets.

Taiwan Patent No. 200844148 discloses preparation of exfoliated clay/polymer nanocomposite latex for use in waterproof gas-barrier materials or gas-barrier coatings or electronic materials. U.S. Pat. No. 5,998,528 discloses a carrier composition comprising a layered material (phyllosilicate), a polymer intercalated between layers of the layered material, an organic liquid and cations. The carrier composition can be used as a carrier material or used for delivery of an active compound such as a drug or cosmetic, wherein the intercalated complex can be exfoliated prior to combination with the organic liquid. Taiwan Patent No. I288648 discloses an inhibitor for harmful micro-organisms, wherein the inhibitor comprises completely exfoliated silicon nanoplatelets and a medium or carrier. The inhibitor is used for encapsulating bacteria so as to suppress the activity of the bacteria.

Currently, the third generation of organic solar cells, e.g. dye-sensitized solar cells (DSSCs) have been developed. Such a dye-sensitized solar cell has a photoelectric conversion efficiency close to that of a crystalline silicon solar cell, but has a relatively simple fabrication process and low fabrication cost. Meanwhile, the dye-sensitized solar cell can be made semi-transparent and accordingly is suitable to be applied to buildings or other goods. Therefore, the research and development of the dye-sensitized solar cells have received considerable attention. To fabricate a dye-sensitized solar cell, $TiO_2$ nanoparticles are porously coated on a transparent conductive substrate such as a conductive glass to function as an anode, and platinum is sputtered on another transparent conductive substrate such as a conductive glass to function as a cathode, a dye sensitizer is chemically adsorbed onto the $TiO_2$ nanoporous structure and finally an electrolyte is added between the anode and cathode.

The electrolyte can be such as a liquid electrolyte, which has a high ion conductivity and provides the dye-sensitized solar cell with a high efficiency. However, the liquid electrolyte easily volatilizes, leaks or dries under scorching of sunlight in long term use of solar cells. A solid electrolyte such as a P-type semiconductor (CuSCN, CuI) or hole transmission material (OMeTDA) overcomes the drawbacks of the liquid electrolyte, but has a high fabrication cost and low photoelectric conversion efficiency. A gel polymer electrolyte is formed by adding a polymer into a liquid electrolyte and the remaining solvent is also easy to volatilize. An ionic liquid electrolyte is non-toxic, has low volatility, excellent thermal stability and high dielectric constant and accordingly has become a development trend of the dye-sensitized solar cells. However, the ion liquid electrolyte is also easy to leak. Therefore, there is still a need to develop an electrolyte composition for dye-sensitized solar cells to overcome the conventional drawbacks of volatility and leakage of electrolyte.

Taiwan Patent No. I284654, No. 200844148, No. I288648 and U.S. Pat. No. 5,998,528 do not suggest or teach the use of exfoliated clay in an electrolyte for solar cells.

Taiwan Patent No. 586248 discloses a gel electrolyte for a lithium secondary battery, which comprises a clay and a gel polymer, wherein the clay is lipophilically modified by a surfactant, the gel polymer is intercalated with the clay in the presence of a plasticizer, and a lithium salt is added thereto so as to form a gel electrolyte. The patent uses the gel polymer to achieve a gel effect, but the patent only increases the distance between the clay layers without achieving complete exfoliation of the clay layers. Therefore, the clay of the patent is not an exfoliated clay.

Therefore, the industry is still not familiar with the encapsulation property of the exfoliated clay and the application of the exfoliated clay in solar cells. On the other hand, there is an urgent need to develop a technology for rapidly encapsulating cations and overcoming the conventional drawbacks of volatility and leakage of electrolyte.

SUMMARY OF THE INVENTION

According to the above drawbacks, the present invention provides a method for making an electrolyte composition of a dye-sensitized solar cell comprising exfoliated clay nanoplatelets; an ionic liquid comprising organic cations and anions; and iodine.

In the electrolyte composition, the ionic liquid is used as a solvent for dissolving the other components of the electrolyte composition in the ionic liquid, wherein the ionic liquid is between 60-95 wt % of a total weight of the electrolyte composition. Further, the weight of the exfoliated clay nanoplatelets is between 0.5-16 wt % of the weight of the ionic liquid. Preferably, the weight of the exfoliated clay nanoplatelets is between 2-14 wt % of the weight of the ionic liquid. More preferably, the weight of the exfoliated clay nanoplatelets is between 6-12 wt % of the weight of the ionic liquid. The weight of iodine is between 1-15 wt % of the weight of the ionic liquid. Preferably, the weight of iodine is between 1-10 wt % of the weight of the ionic liquid. More preferably, the weight of iodine is between 1-5 wt % of the weight of the ionic liquid.

In an embodiment, the exfoliated clay nanoplatelets have a thickness between 0.5 and 2 nanometers; The exfoliated clay nanoplatelets have a length and/or width between 100 and 1000 nanometers, preferably between 200 and 600 nanometers.

In another embodiment, there are 0.5 to 5 negative charges on each square nanometer of the exfoliated clay nanoplatelets. Preferably, there are 1 to 2 negative charges on each square nanometer of the exfoliated clay nanoplatelets.

The present invention does not limit the fabrication method of the exfoliated clay nanoplatelets as long as the clay material can be completely exfoliated and dispersed. For example, the exfoliated clay nanoplatelets can be fabricated by following steps: first, the clay material having a layered structure is mixed with a water-soluble initiator for radical polymerization in water to form an intermediate solution, wherein the water-soluble initiator can be potassium persulfate, ammonium persulfate, water-soluable azo initiator and so on, the weight of which is between 10 and 200 wt % of the layered clay material; adding at least one polar monomer or oligomer (such as vinyl, propenyl) for an emulsifier-free emulsion polymerization so as to form exfoliated clay-polymer composite latex; and finally, the latex is added to a solvent (one or more selected from the group consisting of toluene, benzene, tetrahydrofuran, cyclohexane, tetrachloromethane and chloroform) to remove polymer, thereby obtaining the desired exfoliated clay nanoplatelets.

In an embodiment, the exfoliated clay nanoplatelets are one or more selected from the group consisting of smectite clay, vermiculite, halloysite, sericite and mica, wherein the smectite clay is one or more selected from the group consisting of MMT, saponite, hectorite, beidellite, nontronite and stevensite. In addition, a cationic exchange capacity of a clay material used for preparing the exfoliated clay nanoplatelets is between 50 and 300 meq/100 g.

In the electrolyte composition of the present invention, the ionic liquid can be an ionic liquid used for the conventional solar cells, which mainly functions as a solvent and provides redox reactions needed by the dye-sensitized solar cells. Preferably, the ionic liquid does not contain water and volatile organic solvents such as alcohol and acetonitrile.

In an embodiment, the ionic liquid comprises organic cations and anions, wherein the organic cations are one or more kinds of positively charged organic molecules selected from the group consisting of imidazole, pyridine and tetra-alkyl ammonium; and the anions of the ionic liquid are one or more selected from the group consisting of iodide ions (I−) and organic anions, wherein the organic anions can be such as thiocyanate. In the present invention, alkyl is a C1-C20 linear or branch chain alkyl group. For example, the ionic liquid can be one or more selected from the group consisting of 1-alkyl-3-methylimidazolium iodine, N-alkyl pyridine iodine, tetra-alkyl ammonium iodide, imidazolium thiocyanate, pyridinium thiocyanate and tetra-alkyl ammonium thiocyanate.

In a preferred embodiment, the ionic liquid is one or more selected from the group consisting of propyl-methyl-imidazolium iodide (PMII), 1-ethyl-3-methyl-imidazolium iodide (EMImI), 1,2-dimethyl-3-propyl-imidazolium iodide (DMPII) and 1-ethyl-3-methyl-imidazolium thiocyanate (EMImSCN).

In the electrolyte composition of the present invention, iodine is necessary, which is used for redox reactions of the solar cells. In an embodiment, iodine is provided by iodine molecules. The weight of iodine is between 1-15 wt % of the weight of the ionic liquid. Preferably, the weight of iodine is between 1-10 wt % of the weight of the ionic liquid. More preferably, the weight of iodine is between 1-5 wt % of the weight of the ionic liquid.

The electrolyte composition can comprise an additive according to the practical need. There is no particular restriction on the additive as long as the additive can be dissolved in the ionic liquid. In an embodiment, the additive can increase the voltage or current of the dye-sensitized solar cells. In addition, the weight of the additive is between 0.1-20 wt % of the weight of the ionic liquid. Preferably, the weight of the additive is between 0.5-15 wt % of the weight of the ionic liquid. More preferably, the weight of the additive is between 1-12 wt % based on the weight of the ionic liquid.

In particular, the additive is selected from 1-methylbenzimidazole (NMB), guanidine thiocyanate (GuNCS) and a combination thereof, wherein 1-methylbenzimidazole is a non-dissociation compound, which is added to the electrolyte composition for increasing the photocurrent of the dye-sensitized solar cells; and guanidine thiocyanate can be used for increasing the photovoltage of the dye-sensitized solar cells.

In an embodiment, the electrolyte composition comprises: an ionic liquid used as a solvent, exfoliated clay nanoplatelets with a weight between 0.5-16 wt % of the weight of the ionic liquid; iodine with a weight between 1-15 wt % of the weight of the ionic liquid; and an additive with a weight between 0.1-20 wt % based on the weight of the ionic liquid.

In a preferred embodiment, the electrolyte composition comprises: a PMII ionic liquid, exfoliated clay nanoplatelets with a weight between 0.5-16 wt % of the weight of PMII; iodine with a weight between 1-15 wt % of the weight of PMII; and an additive with a weight between 0.1-20 wt % based on the weight of PMII, wherein the additive comprises 1-methylbenzimidazole (NMB), guanidine thiocyanate (GuNCS).

Conventional electrolyte components such as ionic electrolytes can be dissociated into anions and cations, and therefore are 0-dimensional electrolytes. Polymers are generally 1-dimensional electrolytes with a long chain structure. Compared with the structures of the conventional electrolyte components, the exfoliated clay nanoplatelets existing in the electrolyte composition have a platelet structure, thereby forming a two-dimensional electrolyte. Therefore, the electrolyte composition comprising the exfoliated clay nanoplatelets of the present invention is different from the conventional electrolytes.

In the electrolyte composition of the present invention, the electrolyte composition is gelled by the exfoliated clay nanoplatelets and turns into a gel state. Further, the gelling degree can be adjusted through the concentration of the exfoliated clay nanoplatelets. Therefore, the present invention overcomes the conventional drawbacks that the conventional liquid electrolyte solutions are easy to leak and the conventional DSSC electrolytes are easy to volatile and dry.

Further, the electrolyte composition of the present invention improves the photoelectric conversion efficiency of the dye-sensitized solar cells and facilitates follow-up R&D and mass production of the solar cells.

The present invention further provides a method of instantly encapsulating cations, comprising: providing a solution of exfoliated clay nanoplatelets to mix with a solution comprising cations, so as for the exfoliated clay nanoplatelets to encapsulate the cations to thereby have phase separation occur in the mixed solution; and filtrating the mixed solution so as to separate the clay nanoplatelets encapsulating the cations from the mixed solution.

In an embodiment, the cations are metallic cations such as $Pb^{2+}$ and $Fe^{3+}$. By encapsulating the cations with the exfoliated clay nanoplatelets, the heavy metallic ions can be rapidly encapsulated and separated. Therefore, the method is suitable to be used in environmental pollution prevention and control.

In another embodiment, the cations are positively charged organic molecules, such as positively charged heterocyclic molecules. Through the above-described steps, the exfoliated clay nanoplatelets can encapsulate the cations or drug molecules comprising the cations between layers of the layered structure, thereby facilitating subsequent doses to subject matters.

In the present method, the solution of the exfoliated clay nanoplatelets is obtained by dissolving or suspending the exfoliated clay nanoplatelets in a solvent. Preferably, the solvent is a polar solvent such as water, ethanol and acetonitrile.

In the present method, the anions of the exfoliated clay nanoplatelets are over 50% of the molar equivalent of the cations of the cationic solution. In particular, the anions of the exfoliated clay nanoplatelets are 50 to 200% based the molar equivalent of the cations of the cationic solution.

In an embodiment, the exfoliated clay nanoplatelets are one or more selected from the group consisting of smectite clay, vermiculite, halloysite, sericite and mica. Therein, the smectite clay is one or more selected from the group consisting of MMT, saponite, hectorite, beidellite, nontronite and stevensite.

In an embodiment, a cationic exchange capacity of a clay material is between 50 and 300 meq/100 g.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION OF PREFERRED EMBODIMENTS

The following illustrative embodiments are provided to illustrate the disclosure of the present invention, these and other advantages and effects can be apparent to those skilled in the art after reading the disclosure of this specification.

Embodiment 1

Preparation of Exfoliated Clay Nanoplatelets

Montmorillonite (MMT) (cationic exchange capacity is 127 meq/g) is extracted from bentonite mined in Taitung, eastern Taiwan or directly purchased from manufacturers.

Potassium persulfate (KPS) is dissolved in an aqueous solution and then MMT is added to the aqueous solution so as to form KPS-intercalating MMT denoted as KPS-MMT. An MMA monomer is added to the KPS-MMT aqueous solution for an emulsifier-free emulsion polymerization and after the mixture is stirred for 80 minutes at 70° C., a PMMA-MMT nanocomposite latex (the weight ratio of PMMA to MMT is 20:1) is formed.

The PMMA-MMT nanocomposite latex is dissolved with toluene to remove PMMA. After several times washing by toluene, an aqueous solution of exfoliated MMT nanoplatelets is obtained.

Figure 1:
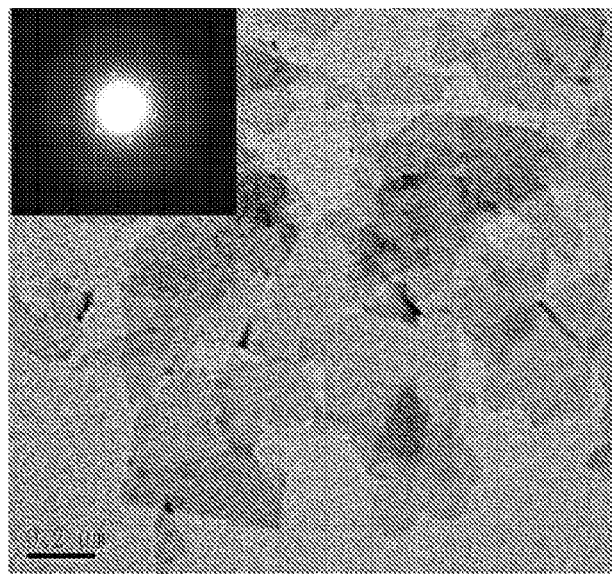
FIG. 1 is a TEM micrograph of the exfoliated MMT nanoplatelets.

The exfoliated MMT nanoplatelet samples are collected by a carbon-film-coated copper grid and dried for transmission electron microscopy (TEM) investigation. The result is shown in FIG. 1.

Embodiment 2

Preparation of an Exfoliated Clay Nanoplatelet Gelled Ionic Liquid

Figure 2:
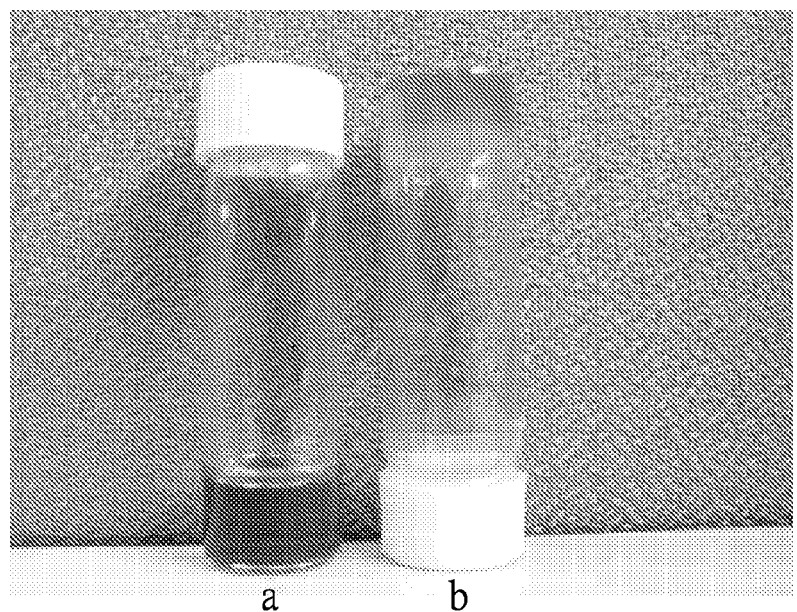
FIG. 2 shows the gelling effect of the exfoliated MMT nanoplatelet gelled PMII ionic liquid, wherein a is a control group showing the PMII ionic liquid without the exfoliated MMT nanoplatelets, and b shows the PMII ionic liquid with 2 wt % exfoliated MMT nanoplatelets added thereto.

The aqueous solution of exfoliated MMT nanoplatelets prepared in Embodiment 1 is added to methyl-propyl-imidazolium iodide (PMII) and uniformly mixed. Then, water is removed under vacuum and the gelling effect is investigated. The result is shown in FIG. 2. In FIG. 2, a is a control group showing PMII ionic liquid without exfoliated MMT nanoplatelets, and b shows the PMII ionic liquid with 2 wt % exfoliated MMT nanoplatelets added thereto, wherein even if the test tube is turned upside down, the electrolyte composition does not drip or flow out, which means that the ionic liquid can be gelled by 2 wt % or above of exfoliated MMT nanoplatelets.

Embodiment 3

Preparation of DSSC Electrolyte Composition

Electrolyte composition (based on the weight of PMII):
1.05 wt % iodine ($I_2$) (purchased from Sigma-Aldrich)
4.4 wt % N-methylbenzimidazole (NMB) (purchased from Sigma-Aldrich)
0.78 wt % guanidinium thiocyanate (GuNCS) (purchased from Acros)
0 wt %, 2 wt %, 6 wt %, 12 wt % MMT nanoplatelets prepared in Embodiment 1
PMII (self-made)

The aqueous solution of MMT nanoplatelets is added to PMII and uniformly mixed. Then, water is removed under vacuum, $I_2$, NMB and GuNCS are added and uniformly mixed at about 50° C. The mixture is then cooled to room temperature and the gelling effect thereof is investigated. The result shows that the electrolyte composition can be completely gelled by 6 wt % or above of MMT nanoplatelets.

Embodiment 4

Performance Test of a Dye-Sensitized Solar Cell

Figure 3:
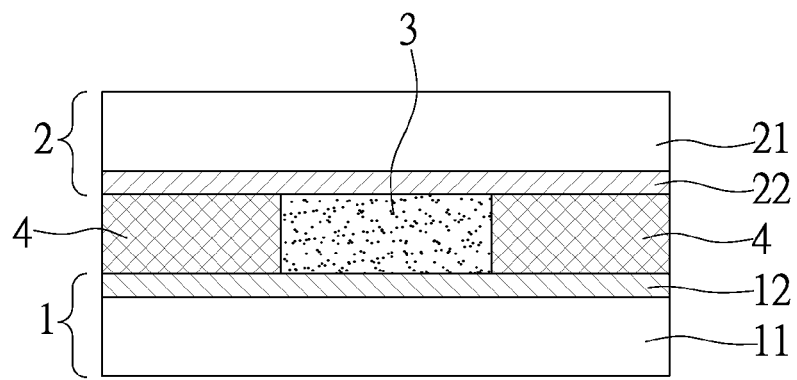
FIG. 3 is a sectional view of a dye-sensitized solar cell.

Referring to the structure of the dye-sensitized solar cell in FIG. 3, an anode 1 is prepared through a standard process. First, a mesoporous anatase $TiO_2$ thin film with a thickness of about 10 μm is sintered on the surface of an ITO conductive glass 11 (purchased from Solaronix, surface resistivity=~15Ω/□). The thin film is immersed in N3 dye with a concentration of $3\times10^{-4}$ M (purchased from UnirRegion Bio-Tech, the solvent for the N3 dye contains acetonitrile and t-butyl alcohol at a volume ratio of 1:1). After 24 hours, it is taken out and washed by acetonitrile and then dried, thereby forming a dye layer 12.

Further, another ITO conductive glass 21 (purchased from Solaronix, surface resistivity=~7Ω/□) is provided and a platinum (Pt) layer 22 with a thickness of 100 nm is formed on the surface of the ITO conductive glass 21 by sputtering so as to function as a cathode 2 of the dye-sensitized solar cell. A piece of plastic spacer 4 is placed in between the dye layer 12 and the platinum layer 22, thereby forming a space between the anode and cathode for receiving the electrolyte composition.

Two small holes are bored in the cathode 2 for injection of the electrolyte composition. The electrolyte composition of the present invention is pre-heated to a flow state and then injected through the small holes into the space between the anode and cathode, thereby forming electrolyte 3. Finally, the two holes are sealed.

Figure 4:
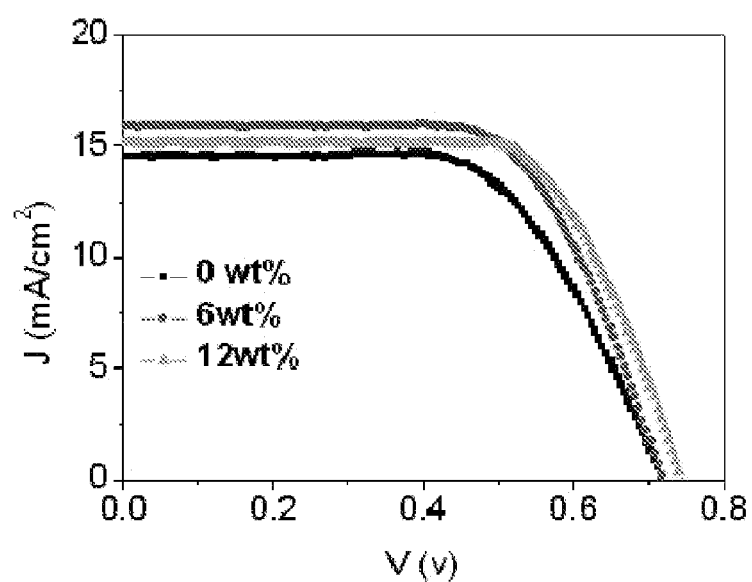
FIG. 4 is a current-voltage plot of the dye-sensitized solar cell (DSSC), wherein ■ represents a control group, ● represents the DSSC prepared by using an electrolyte composition with 6 wt % exfoliated MMT nanoplatelets, ▲ represents the DSCC prepared by using an electrolyte composition with 12 wt % exfoliated MMT nanoplatelets.

The prepared dye-sensitized solar cell is disposed under irradiation of AM 1.5, 100 mW/cm² simulated sunlight and the current-voltage characteristics thereof is measured. The result is shown in FIG. 4. The photoelectric conversion efficiency of the dye-sensitized solar cell is shown in Table 1.

TABLE 1

| MMT concentration (wt %) | $V_{oc}$ (v) | $J_{sc}$ (mA/cm²) | FF | η (%) |
|---|---|---|---|---|
| 0 | 0.718 ± 0.002 | 14.548 ± 0.531 | 0.633 ± 0.025 | 6.587 ± 0.061 |
| 6 | 0.727 ± 0.003 | 15.932 ± 1.489 | 0.660 ± 0.086 | 7.646 ± 0.300 |
| 12 | 0.741 ± 0.004 | 15.128 ± 0.729 | 0.693 ± 0.027 | 7.772 ± 0.082 |

(where $V_{oc}$ represents open circuit voltage, $J_{sc}$ represents short circuit current, FF represents fill factor, η represents conversion efficiency)

According to Table 1, the electrolyte composition comprising the MMT nanoplatelets can be completely gelled and does not drip or overflow. Meanwhile, as the MMT concentration in the electrolyte increases from zero to 12 wt %, the photoelectric conversion efficiency is improved from 6.6% to 7.7%. Further, as shown in FIG. 4, when the MMT concentration increases, the voltage of the prepared dye-sensitized solar cell increases while the current slightly decreases.

Compared with the conventional dye-sensitized solar cells prepared by using PMII, the electrolyte composition of the present invention achieves a higher photoelectric conversion efficiency.

Therefore, the DSSC electrolyte composition of the present invention overcomes the conventional drawbacks that the DSSC electrolytes easily volatilize, leak or dry, and effectively improves the photoelectric conversion efficiency of the dye-sensitized solar cells, thereby facilitating follow-up R&D and mass production of the solar cells.

Embodiment 5

Cationic Encapsulation Test (1) Cationic Chemicals

An aqueous solution of tris(2,2'-bipyridyl)dichlororuthenium(II) hexahydrate, $(Ru(bpy)_3Cl_2$, purchased from Sigma-Aldrich) and an aqueous solution of methylene blue (MB, purchased from Acos) with the concentration varying from $1\times10^{-4}$M to $1\times10^{-2}$M are used as $Ru(bpy)_3^{+2}$ and $MB^+$ cationic chemicals for the encapsulation test.

The MMT nanoplatelets prepared in Embodiment 1 is dissolved in water so as to prepare an aqueous solution of MMT nanoplatelets with a concentration of 0.36 wt %. Further, 1.5 ml aqueous solution of MMT nanoplatelets is mixed with 1.5 ml cationic aqueous solution, and the encapsulation effect is observed. Further, the encapsulation substance is filtered to obtain a clarified aqueous solution.

Figure 5A:
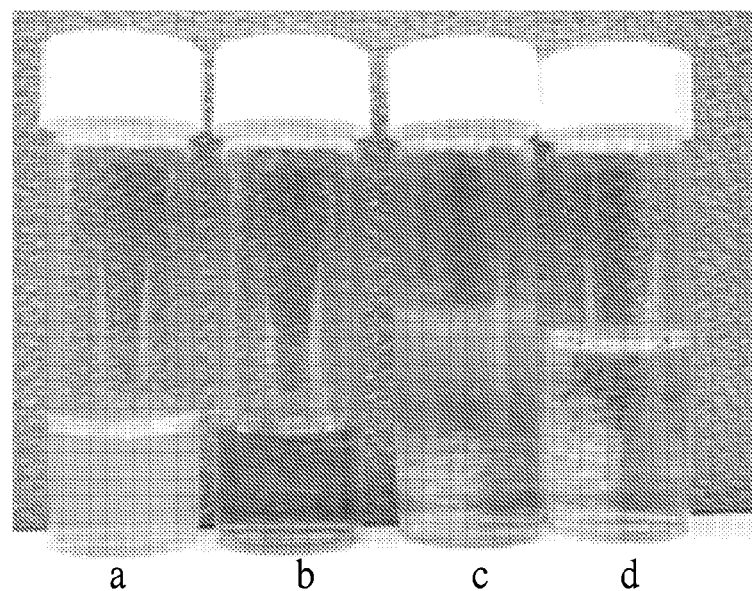
FIG. 5A shows the test result of encapsulation of cation chemicals of $Ru(bpy)_3Cl_2$ by exfoliated MMT nanoplatelets, wherein a represents an aqueous solution of exfoliated MMT nanoplatelets, b represents an aqueous solution of $Ru(bpy)_3Cl_2$, c represents an instant mixing result of a and b, and d represents the clarified aqueous solution after a filtrating process is performed to c.

The test result for the aqueous solution of $Ru(bpy)_3Cl_2$ with the concentration of $1\times10^{-4}$ M is shown in FIG. 5A, wherein a represents the aqueous solution of exfoliated MMT nanoplatelets, b represents the aqueous solution of $Ru(bpy)_3Cl_2$, c shows the instant mixing result of a and b, wherein phase separation instantly occur to form suspended matter, and the suspended matter is MMT having a layered structure formed after the cations of $Ru(bpy)_3^{2+}$ are encapsulated by the MMT nanoplatelets, d shows the clarified aqueous solution after c is filtrated.

Figure 5B:
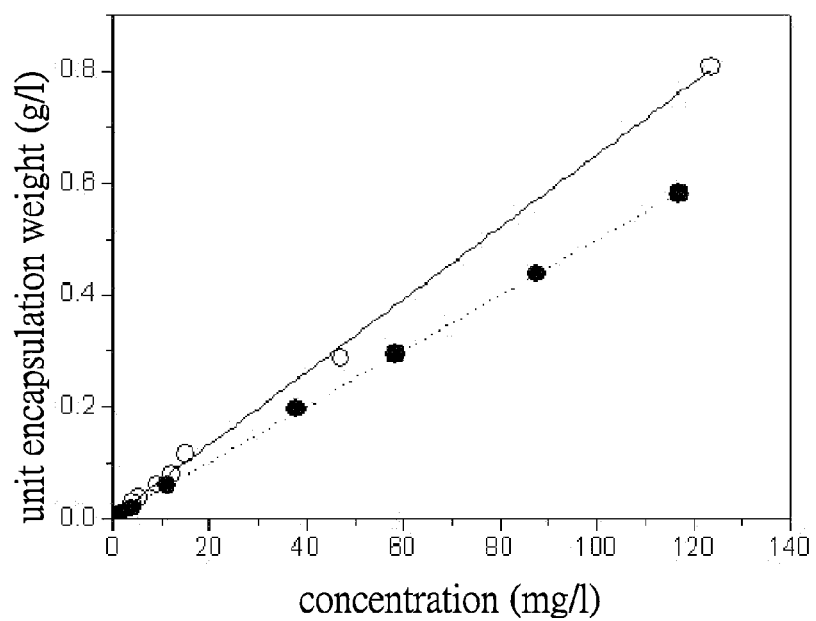
FIG. 5B is a plot showing the adsorption of cation chemicals by exfoliated MMT nanoplatelets according to the Langmuir adsorption equation, wherein ○ represents $Ru(bpy)_3^{2+}$, ● represents $MB^+$.

The aqueous solutions of $Ru(bpy)_3Cl_2$ and MB with different concentrations are respectively mixed with the aqueous solution of MMT nanoplatelets and suspended matters formed therein are filtered to obtain clarified aqueous solutions. Then, the residual cationic concentration ($C_e$) in the clarified aqueous solution is measured by a UV spectrometer, the unit encapsulation weight ($q_e$) of MMT nanoplatelets to $Ru(bpy)_3^{2+}$ is calculated, and the Langmuir adsorption equation 1 is used to plot FIG. 5B, thereby obtaining the slope (m) and intercept (b), are shown in Table 2.

$$C_e/q_e = mC_e + b \quad (1)$$

Further, the coverage (σ°) of the MMT nanoplatelets by each cation is calculated through equation 2, as shown in Table 2.

$$m = N_A \sigma°/A_{sp} \quad (2)$$

wherein $N_A$ is Avogadro's constant, $A_{sp}$ is specific surface area of the MMT nanoplatelets.

TABLE 2

|  | m (g/mg) | b (g/L) | σ° (nm)² |
|---|---|---|---|
| $Ru(bpy)_3^{2+}$ | 0.00647 | 0.00371 | 4.708 |
| $MB^+$ | 0.00497 | 0.00188 | 1.806 |

According to conventional literatures, the planar area of each $Ru(bpy)_3^{2+}$ is estimated to be 3.5 nm², and the planar area of each $MB^+$ is 1.34 nm². According to Table 2, the coverage of the MMT nanoplatelets by the cations is about 1.35 times the area of the cations, which means that the cations are mono-molecularly adsorbed, thereby achieving an excellent encapsulation effect.

Figure 5C:
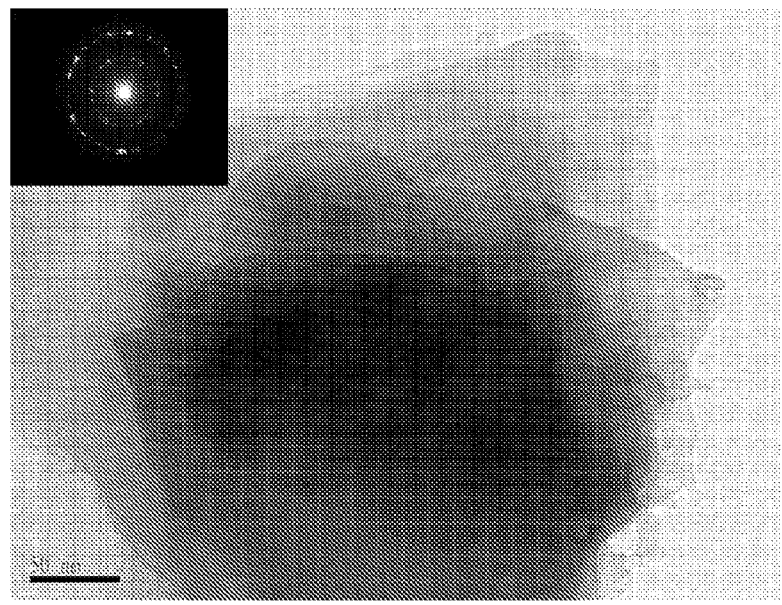
FIG. 5C is a TEM micrograph of the layered structure of the exfoliated MMT nanoplatelets encapsulating $Ru(bpy)_3^{2+}$.

FIG. 5C shows the structure with the exfoliated MMT nanoplatelets encapsulating the cations of $Ru(bpy)_3^{2+}$ observed through TEM. As shown in FIG. 5C, the exfoliated MMT nanoplatelets have recovered to a layered structure.

Figure 5D:
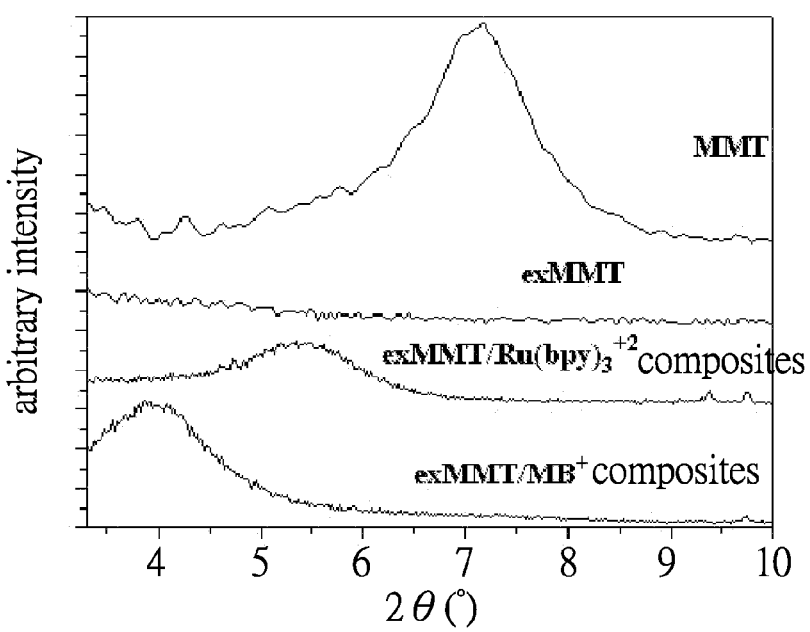
FIG. 5D are WAXS diffraction patterns of non-exfoliated MMT, exfoliated MMT nanoplatelets (exMMT), composites of exfoliated MMT nanoplatelets and $Ru(bpy)_3^{2+}$(exMMT/$Ru(bpy)_3^{2+}$), and composites of exfoliated MMT nanoplatelets and $MB^+$(exMMT/$MB^+$)

FIG. 5D are WAXS diffraction patterns showing that the distance between layers of composites of exfoliated MMT nanoplatelets/$Ru(bpy)_3^{2+}$(exMMT/$Ru(bpy)_3^{2+}$) is 16.3 Å and the distance between layers of composites of exfoliated MMT nanoplatelets/$MB^+$(exMMT/$MB^+$) is 22.6 Å, both of which are greater than the distance between layers of the unexfoliated MMT of 12.3 Å.

Therefore, the exfoliated clay nanoplatelets recover to a layered structure and encapsulates the cations between layers thereof so as to facilitate subsequent chemical addition into subject matters.

(2) Metallic Cationic Encapsulation Test

An aqueous solution of lead nitrate with a concentration of $1 \times 10^{-2}$ M and an aqueous solution of ferric chloride with a concentration of $1 \times 10^{-2}$ M are used for the encapsulation test. 1.5 ml aqueous solution of MMT nanoplatelets with a concentration of 0.36 wt % is respectively mixed with 1.5 ml metallic cationic aqueous solutions, and the encapsulation effect is observed. The result is shown in FIG. 6.

Figure 6A:
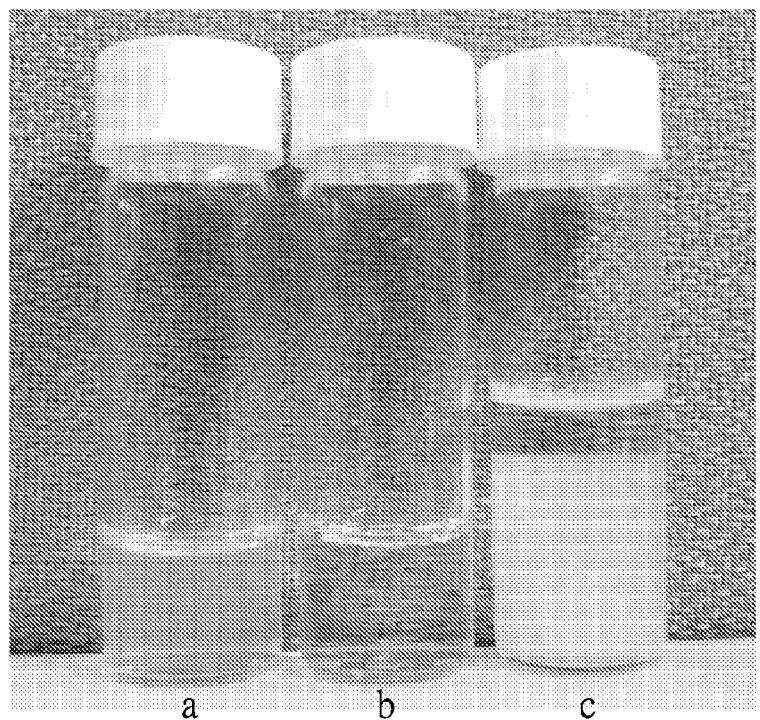
FIG. 6A shows the test result of encapsulation of cations of $Ru(bpy)_3Cl_2$ by exfoliated MMT nanoplatelets, wherein a represents an aqueous solution of exfoliated MMT nanoplatelets, b represents an aqueous solution of $Pb(NO_3)_2$, and c represents an instant mixing result of a and b.

In FIG. 6A, a represents the aqueous solution of exfoliated MMT nanoplatelets, b represents the aqueous solution of lead nitrate, c represents an instant mixing result of a and b, wherein phase separation instantly occur to form suspended matter, and the suspended matter is layered MMT encapsulating $Pb^{2+}$.

Figure 6B:
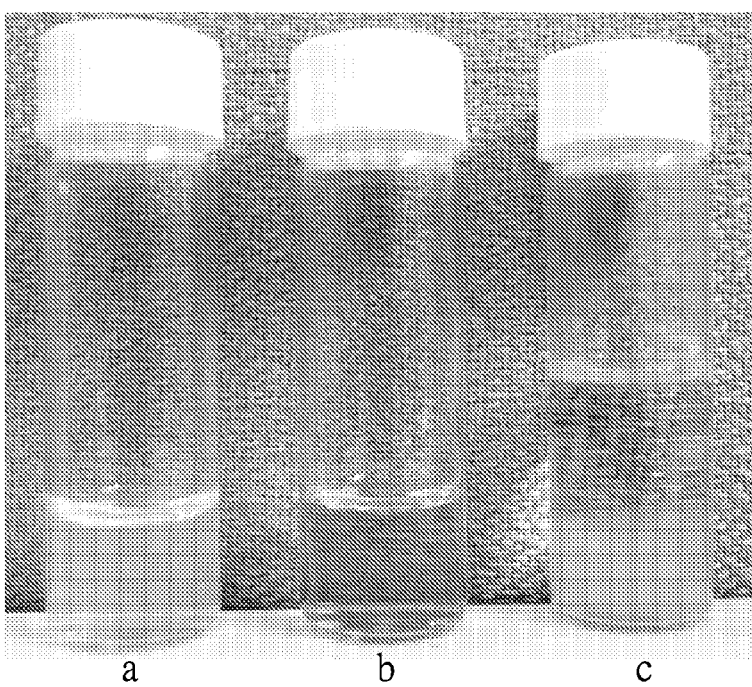
FIG. 6B shows the test result of encapsulation of cations of $FeCl_3$ by exfoliated MMT nanoplatelets, wherein a represents an aqueous solution of exfoliated MMT nanoplatelets, b represents an aqueous solution of $FeCl_3$, and c represents an instant mixing result of a and b.

In FIG. 6B, a represents the aqueous solution of exfoliated MMT nanoplatelets, b represents the aqueous solution of ferric chloride, c represents an instant mixing result of a and b, wherein phase separation instantly occur to form suspended matter, and the suspended matter is layered MMT encapsulating $Fe^{3+}$.

The exfoliated MMT nanoplatelets recover to a layered structure after encapsulating the cations.

Therefore, the method of instantly encapsulating cations according to the present invention can rapidly encapsulate and separate heavy metallic ions and is suitable to be used in environmental pollution prevention and control.

The above-described descriptions of the detailed embodiments are only to illustrate the preferred implementation according to the present invention, and it is not to limit the scope of the present invention, Accordingly, all modifications and variations completed by those with ordinary skill in the art should fall within the scope of present invention defined by the appended claims.

What is claimed is:

1. A method for making an electrolyte composition of a dye-sensitized solar cell, comprising steps of:
    mixing exfoliated clay nanoplatelets with an ionic liquid to form a mixture, wherein the ionic liquid comprises organic cations and anions; and
    adding iodine to the mixture.

2. The method of claim 1, wherein the weight of the exfoliated clay nanoplatelets is between 0.5-16 wt % of the weight of the ionic liquid.

3. The method of claim 2, wherein the exfoliated clay nanoplatelets have a thickness between 0.5 and 5 nanometers.

4. The method of claim 2, wherein there are 0.5 to 5 negative charges on each square nanometer of the exfoliated clay nanoplatelets.

5. The method of claim 1, wherein the exfoliated clay nanoplatelets are one or more selected from the group consisting of smectite clay, vermiculite, halloysite, sericite and mica.

6. The method of claim 5, wherein the smectite clay is one or more selected from the group consisting of MMT, saponite, hectorite, beidellite, nontronite and stevensite.

7. The method of claim 5, wherein a cationic exchange capacity of a clay material is between 50 and 300 meq/100 g.

8. The method of claim 1, wherein the ionic liquid is between 60-95 wt % of a total weight of the electrolyte composition.

9. The method of claim 1, wherein the organic cations of the ionic liquid are one or more kinds of positively charged organic molecules selected from the group consisting of imidazole, pyridine and tetra-alkyl ammonium.

10. The method of claim 1, wherein the anions of the ionic liquid are one or more selected from the group consisting of iodide ions ($I^-$) and organic anions.

11. The method of claim 9, wherein the anions of the ionic liquid are one or more selected from the group consisting of iodide ions ($I^-$) and organic anions.

12. The method of claim 1, wherein the ionic liquid is one or more selected from the group consisting of 1-alkyl-3-methylimidazolium iodine, N-alkyl pyridine iodine, tetra-alkyl ammonium iodide, imidazolium thiocyanate, pyridinium thiocyanate and tetra-alkyl ammonium thiocyanate.

13. The method of claim 12, wherein the ionic liquid is one or more selected from the group consisting of propyl-methyl-imidazolium iodide (PMII), 1-ethyl-3-methyl-imidazolium iodide, 1,2-dimethyl-3-propyl-imidazolium iodide, 1-ethyl-3-methyl-imidazolium thiocyanate.

14. The method of claim 1, further comprising the step of adding an additive selected from 1-methylbenzimidazole (NMB), guanidine thiocyanate (GuNCS) and a combination thereof.

* * * * *